United States Patent [19]

Kluger

[11] 4,340,717
[45] Jul. 20, 1982

[54] NITROGEN-CONTAINING COMPOUNDS

[75] Inventor: Edward W. Kluger, Pauline, S.C.

[73] Assignee: Milliken Research Corporation, Spartanburg, S.C.

[21] Appl. No.: 243,096

[22] Filed: Mar. 12, 1981

[51] Int. Cl.³ .................. C08G 59/50; C07C 87/38; C07C 87/45; C07C 91/14

[52] U.S. Cl. .................. 528/111; 528/122; 528/407; 564/445; 564/457; 564/461; 564/462

[58] Field of Search .................. 528/111, 122, 407; 564/445, 457, 461, 462

[56] References Cited

U.S. PATENT DOCUMENTS

| | | | |
|---|---|---|---|
| 3,068,286 | 12/1962 | Brindell | 564/462 |
| 3,112,345 | 11/1963 | Stansbury et al. | 528/111 X |
| 3,597,483 | 8/1971 | Haarer et al. | 564/461 X |
| 3,625,918 | 12/1971 | Meer et al. | 528/122 |

Primary Examiner—Earl A. Nielsen
Attorney, Agent, or Firm—H. William Petry; Terry T. Moyer

[57] ABSTRACT

Nitrogen-containing compounds are provided which are selected from compounds having the following formula:

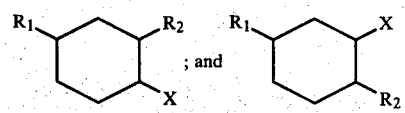

wherein X is selected from OH and $NH_2$, $R_1$ is selected from $-CH=CH_2$ and $-C_2H_5$, and $R_2$ is selected from $-NH_2$ and:

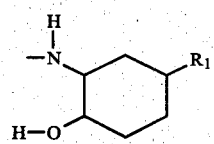

where $R_1$ has the value indicated above.

7 Claims, No Drawings

NITROGEN-CONTAINING COMPOUNDS

The present invention relates to nitrogen-containing compounds, and to methods for curing epoxy resins wherein nitrogen-containing compounds are employed as curing agents. The present invention also relates to epoxy resin compositions containing nitrogen-containing compounds as epoxy curing agents.

Epoxy resins were first introduced commercially in the United States in about 1950 and since then their use has grown rapidly. Epoxy resins may be broadly defined as resinous intermediate materials which are characterized by the presence of the epoxy group,

In general, epoxy resins are not used by themselves but rather they require the addition of a curing agent or hardener to convert them into a thermoset material. Epoxy resins have gained wide acceptance in structural applications and in protective coatings because of their generally excellent toughness, adhesion, chemical resistance, and electrical properties. The combination of these properties is generally not found in any other single plastic material.

A relatively large number of chemical reagents are available or known to have utility as curing agents or hardeners which may be added to epoxy resins to convert them to thermoset materials. It is also known that in the curing process both the epoxy and the hydroxyl groups of the resin may be involved. Curing agents are available whereby curing may be accomplished at room temperature or upon heating. Curing may take place in general either by a coupling or addition process, or by catalytic polymerization.

The known curing agents or hardeners for epoxy resins fall into three categories: (1) the acidic type, e.g., acid anhydrides; (2) aldehyde condensation products, e.g., phenol-, urea-, and melamine-formaldehyde resins; and (3) amine type, e.g., aliphatic and aromatic amines, polyamides, tertiary amines, and amine adducts. The novel nitrogen-containing compounds of the present invention may be employed as the third type, namely the amine type, of epoxy curing agent.

The nitrogen-containing compounds of the present invention are selected from compounds having the following formula:

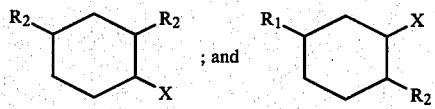

wherein X is selected from OH and NH$_2$, R$_1$ is selected from —CH=CH$_2$ and —C$_2$H$_5$, and R$_2$ is selected from —NH$_2$ and:

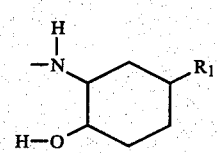

where R$_1$ has the value indicated above.

The present invention also relates to the use of such compounds as epoxy curing agents and to epoxy resin compositions which contain 100 parts by weight of at least one epoxy resin and from about 10 parts to about 50 parts, preferably about 15 parts to about 30 parts by weight of the nitrogen-containing compounds of the invention. Such cured products have good flexibility, high heat distortion temperatures and excellent solvent resistance.

The nitrogen-containing compounds of the present invention may be prepared quite conveniently by reaction of the corresponding 5-substituted aminohydroxycyclohexanes with ammonia in the presence of a nickel catalyst. For convenience such reaction will be described in detail by reference to the use as a starting material of 5-ethyl-1-amino-2-hydroxy and 5-ethyl-1-hydroxy-2-aminocyclohexanes, it being understood that such description is not to be construed as a limitation on the scope of the invention. According to such embodiment, 5-ethyl-1-amino-2-hydroxy and 5-ethyl-1-hydroxy-2-aminocyclohexanes are reacted with ammonia in the presence of a nickel catalyst as shown by the equation below:

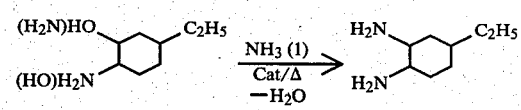

The temperature at which the above described reaction may be carried out may vary widely. However, generally the temperature may be in a range of from about 150°–300° C. and preferably in a range of 170°–190° C. Likewise, the period of time required for the reaction to go to substantial completion may vary widely, such being dependent on the ammonia concentration, the catalyst concentration, as well as the temperature at which such reaction is conducted. Generally, however, the reaction proceeds to completion when the reactants are contacted at the required temperature for a perod of time from about 6 to about 12 hours. It has been observed that better results may be obtained when a small amount of hydrogen gas is included in the reaction mixture, however, the presence of hydrogen is not necessary. The reaction can be run in excess of stoichiometric amounts of liquid ammonia or ammonium hydroxide. Generally, it has been found that from stoichiometric to about a 20 molar excess of liquid ammonia or ammonium hydroxide may be employed. The preferred quantity of liquid ammonia or ammonium hydroxide may be about a 2 to about a 5 molar excess.

In carrying out the reaction any suitable reduction catalyst may be employed. Typical of such reduction catalysts are raney nickel, cobalt, palladium, platinum, ruthenium, rhodium, osmium, iridium, iron, including salts and oxides thereof and the like. Further, such catalysts may be in their free metal state or extended on a support such as charcoal, aluminum, kieselguhr and the like.

The amount of catalyst employed in the reaction may vary widely. However, generally the amount of catalyst may vary from about 1 to 30 weight percent, preferably from about 5 to 10 weight percent.

The reaction may be carried out in the presence or absence of a solvent. When solvent is employed, any suitable solvent which will not interfere with the desired reaction may be employed. Such as cycloaliphatic ethers, eg., dioxane, tetrahydrofuran, and the like and higher boiling hydrocarbons, eg., hexane, cyclohexane, heptane, decane, toluene, xylenes, and the like and alcohols, eg., methyl alcohol, ethyl alcohol, isopropyl alcohol, isobutyl alcohol and the like. In addition to the organic solvents listed above, water can be used and may in fact be preferred.

The use of hydrogen gas was also found to be advantageous in this reaction. If hydrogen is used generally initial pressure of about 50 to about 300 psi may be prefered.

The process of 5-ethyl-1,2-diaminocyclohexane preparation has been described as a batch operation carried out in a high pressure stirred autoclave. However, other reaction modes will give equally good results. A continuous flow reactor may be used with suspended or fixed bed solid catalyst operating at the proper temperature, pressure, and flow rate to give the desired product. Alternatively, the desired reaction can be accomplished by incremental addition of the aminoalcohol to a batch type reactor at the proper described operating conditions.

The pure 5-ethyl-1,2-diaminocyclohexane may be separated from the crude reaction mixture by filtration from the catalyst and insoluble material, distilling off the excess ammonia (and/or solvent) and thereafter distilling the crude diamine under atmospheric or reduced pressure.

In accordance with such embodiment 5-ethyl-1-hydroxy-2-aminocyclohexane may be produced by the reduction of 5-vinyl-1-hydroxy-2-amino and 5-vinyl-1-amino-2-hydroxycyclohexanes with hydrogen either in the presence or in the absence of a solvent and a metal catalyst. This corresponding aminoalcohol is produced in high yield as shown in the following equation:

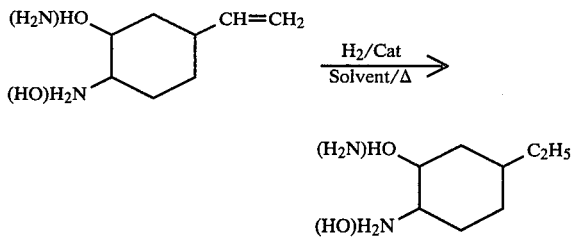

Again, such synthesis will be described with particular reference to the use as a starting material of a particular vinylaminocyclohexanols, although it is to be understood that the invention is not to be limited thereby.

The temperature at which the above described reduction of vinylaminoalcohols may be carried out may vary widely. However, generally the temperature may be in a range of from about 25°–150° C. and preferably in the range of 25°–125° C. Likewise, the period of time required for the reaction to go to substantial completion can vary widely, such being dependent on the hydrogen pressure and the particular catalyst employed as well as the temperature at which such reaction is carried out. Generally, however, the reaction may proceed to completion when the reactants are contacted at the required temperature for a period of time from about 0.5 to about 8 hours. Pressures in the range of about 10 to about 2000 psi can be used to accomplish the reduction. While pressure in the higher range (1500–2000 psi) can be used and may be advantageous, the preferable range of pressure is 10–500 psi.

The hydrogenation of the vinylaminoalcohol can be carried out in the presence or absence of a solvent. When solvent is employed, any suitable solvent which will not interfere with the desired hydrogenation can be employed, such as cycloaliphatic ethers, eg., dioxane, tetrahydrofuran, and the like and higher boiling hydrocarbons, eg., hexane, cyclohexane, heptane, decane, toluene, xylenes, and the like and alcohols, eg., methyl alcohol, ethyl alcohol, isopropyl alcohol, isobutyl alcohol and the like.

In carrying out the reduction of the vinylaminoalcohols any suitable reduction catalyst can be employed. Typical of such reduction catalysts are raney nickel, cobalt, palladium, platinum, ruthenium, rhodium, osmium, iridium, iron, including salts and oxides thereof and the like. Further, such catalysts can be in their free metal state or extended on a support such as charcoal, aluminum, kieselguhr and the like.

The amount of catalyst employed in the reduction can vary widely. However, generally the amount of catalyst will vary from about 1 to 15 weight percent, preferably from about 1 to 5 weight percent.

The process of reducing the vinylaminoalcohols has been described as a batch operation carried out in a high pressure stirred autoclave. However, other reducing modes will give equally good results. A continuous flow reactor may be used with suspended or fixed bed solid catalyst operating at the proper temperature, pressure, and flow rate to give the desired reduction. Alternatively, the desired reduction can be accomplished by incremental addition of the vinylaminoalcohols to a batch type reactor at the proper described operating conditions.

The pure 5-ethyl-1-hydroxy-2-amino- and 5-ethyl-1-amino-2-hydroxy-cyclohexanes can be separated from the crude reaction mixture by filtration from the catalyst and insoluble material, distilling off the solvent and fractionation of the crude product under atmospheric or reduced pressure.

According to yet another embodiment of the present invention, 5-vinyl-1-amino-2-hydroxy- and 5-vinyl-1-amino-2-hydroxycyclohexane maybe prepared by the reaction of 4-vinylcyclohexene monoxide (3-vinyl-7-oxabicyclo[4.1.0]heptane) with ammonia in high yield as is shown in the equation below:

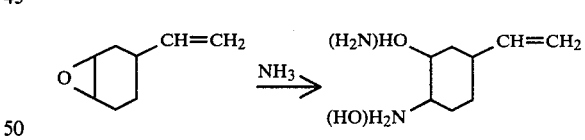

Again, such synthesis will be described with particular reference to the use as a starting material of 4-vinylcyclohexene monoxide, although it is to be understood the invention is not to be limited thereby.

The temperature at which the above described reaction may be carried out can vary widely. However, generally the temperature will be in a range of from about 25°–150° C. and preferably in the range of 25°–100° C. Likewise, the period of time required for the reaction to go to substantial completion can vary widely, such being dependent on the ammonia concentration as well as the temperature at which such reaction is conducted. Generally, however, the reaction proceeds to completion when the reactants are contacted at the required temperature for a period of time from about 4 to about 12 hours. The reaction may generally be run in excess liquid ammonia or ammonium hydroxide. A molar excess of ammonia from about 5 to about 50 where about 20 to about 40 moles excess is preferred.

The reaction can be carried out in the presence or absence of a solvent. When solvent is employed, any suitable solvent which will not interfere with the desired reaction can be employed, such as cycloaliphatic ethers, eg., dioxane, tetrahydrofuran, and the like and higher boiling hydrocarbons, eg., hexane, cyclohexane, heptane, decane, toluene, xylenes, and the like and alcohols, eg., methyl alcohol, ethyl alcohol, isopropyl alcohol, isobutyl alcohol and the like.

The pure 5-vinyl-1-hydroxy-2-amino and 5-vinyl-diamino-2-hyclcoxylcyclohexanes can be separated from the excess ammonia and solvent by fractionation of the crude product at atmospheric or reduced pressure.

One particularly important use for the novel compounds of the present invention is their use as epoxy curing agents for polyepoxides. The polyepoxides which can be cured at elevated temperatures using the nitrogen-containing compounds as herein described are those polyepoxides possessing at least two

groups. These groups may be terminal, i.e.,

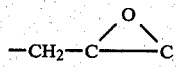

groups, or they may be in an internal position. However, especially desirable results can be obtained when the epoxy groups are terminal. The polyepoxides may be saturated or unsaturated, aliphatic, cycloaliphatic, aromatic or heterocyclic, and may be substituted such as with hydroxyl groups, ether radicals and the like. Further, the polyepoxides can be monomeric or polymeric. Such polyepoxides, and their preparation, are well known in the art.

The curing of the polyepoxides with the above-described amino compound curing agents of the present invention may be accomplished by simply mixing the two components together. While the reaction between the two components may occur slowly at room temperature, improved results can be obtained if the mixture is heated to a temperature of from about 50° C. to about 280° C. for a period of time of from about 1 to about 12 hours and thereafter post-curing the reaction product for an additional period of time from about 1 to about 8 hours at a temperature of from about 140° C. to about 225° C. With a small casting, curing of the reaction mixture can be obtained by heating the reaction mixture for about 2 hours at a temperature of from about 80° C. to about 100° C. and thereafter post-curing the reaction product at a temperature of from about 140° C. to about 225° C. for an additional 2 hours or so.

In curing polyepoxides it is generally desirable that the polyepoxide be in a mobile condition when the curing agent is added to ensure uniform mixing. If the polyepoxide is extremely viscous or solid at room or casting temperature, the polyepoxide may be heated to reduce the viscosity or a volatile liquid solvent which can escape from the polyepoxide composition containing the novel nitrogen-containing compound curing agent by evaporation before and/or during the curing of such polyepoxide composition can be added to the polyepoxide to reduce its viscosity. Typical of such volatile liquid solvents are ketones, such as acetone, methyl ethyl ketone and the like, ethers, such as ethyl acetate, butyl acetate and the like, ether alcohols, such as methyl, ethyl or butyl ethers of ethylene glycol and chlorinated hydrocarbons, such as chloroform.

In addition to the use of the nitrogen-containing compounds of the present invention as epoxy curing agents, many other uses can readily be envisioned by those skilled in the art. Thus, not only do the compounds of the present invention find utility as epoxy curing agents but such compositions can be employed as oil and fuel adductive intermediates. Further, the polyamines may be employed for the formation of diisocyanate compositions for the incorporation into polyurethane compositions, and the compound may be further reacted to form novel and useful polyamides.

In order to more fully describe the preparation and use of the novel compounds of the present invention the following examples are given. However, such examples are presented for illustration only and are not to be construed as unduly limiting the scope of the present invention. Unless otherwise indicated, all parts and/or percentages given in these examples are by weight.

EXAMPLE 1

In a 5000 cc three necked flask equipped with mechanical stirrer, dropping funnel, and reflex condenser was charged 3800 cc of 30% wt. ammonium hydroxide and 600 cc of methyl alcohol. Over the course of 45 minutes, 371.3 gm (3.0 moles) of 4-vinylcyclohexene monoxide was added through the dropping funnel. The mixture was allowed to stir for 12 hours at room temperature after which a homogeneous solution resulted. The excess water, methyl alcohol and ammonia was then stripped away from the crude product at under vacuum (15-20 mmHg) and 40°-80° C. to give a low melting white solid. The crude vinylaminoalcohol was further purified by distillation at 144°-159° C. and 15-20 mmHg vacuum to give a solid melting at 43°-46° C.

The IR, proton NMR, and GC-mass spectra were consistent with 5-vinyl-1-amino-2-hydroxy and 5-vinyl-1-hydroxy-2-aminocyclohexanes.

EXAMPLE 2

In a 1000 cc parr bottle was charged 119.67 gm (0.85 moles) of purified 5-vinyl-1-amino-2-hydroxyl and 5-vinyl-1-hydroxyl-2-aminocyclohexanes from example #1 in 95 gm of methyl alcohol, and 3.6 gm of 5% Palladium on carbon catalyst. The bottle was then placed on a parr shaker and the hydrogen pressure was adjusted to 60 psi. The hydrogen pressure dropped quickly to 13 psi after about 1½ hours of shaking. It was repressured again and allowed to shake until no further hydrogen drop could be detected. The solvent was removed from the product under vacuum to give a low melting product. This 5-ethyl-1-amino-2-hydroxy and 5-ethyl-1-hydroxy-2-aminocyclohexanes was further purified by distillation at 140°-145° C. and 15-20 mmHg to give a white low melting solid. The IR, proton NMR, and GC-mass spectra were consistent with the product.

EXAMPLE 3

In a 1000 cc stirred autoclave was charged 197.6 g (1.38 moles) of purified 5-ethyl-1-amino-2-hydroxy and 5-ethyl-1-hydroxy-2-amino-cyclohexanes from example

2 along with 10 g of raney nickel catalyst #3000. The autoclave was purged three times with hydrogen then 143 gm of liquid ammonia was added and the autoclave was pressured to 400 psi with hydrogen gas. On heating to 170°–175° C. and pressure of 1400–1500 psi resulted. After 9 hours at 170°–175° C. the autoclave was cooled and the ammonia vented. The crude product was filtered from the catalyst and the excess ammonia and water removed to give a pale orange liquid. The crude product was further purified by distillation at atmospheric pressure under nitrogen at 224.5° to 225° C. to give the colorless 5-ethyl-1,2-diaminocyclo-hexane. The IR, proton NMR, carbon-13 NMR, and GC-mass spectra were consistent with the diamine as was the elemental analysis:

Calc. for $C_8H_{18}N_2$: C, 67,61%; H, 12.68%; N, 19.71%. Found: C, 67.93%; H, 12.75%; N, 19.57%.

EXAMPLE 4

To five beakers each containing 100 parts of epoxy resin based on diglycidyl ether of bisphenol A (n=0.2, WPE=185–195)

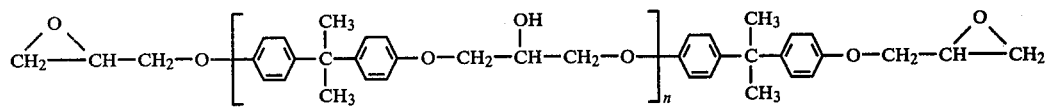

were added the corresponding parts of 5-ethyl-1,2-diaminocyclohexane prepared in example #3: 17.2 parts, 19.0 parts, 20.5 parts, 22.2 parts, and 23.5 parts. After mixing each beaker thoroughly for 2 minutes and centrifuging at a speed of 3000 rpm, these resin mixtures were placed in an aluminum mold and were cured for 2 hours at 80° C. and for another 2 hours at 150° C. The crosslinked products had glass transition temperatures measured with a differential scannning calorimeter (Perkin Elmer Model DSC-2) as are summarized in the following table.

| GLASS TRANSITION TEMPERATURE FOR 5-ETHYL-1,2-DIAMINOCYCLOHEXANE | | |
|---|---|---|
| ENTRY | PHR | Tg(°C.) |
| 1 | 17.2 | 124.5 |
| 2 | 19.0 | 147.0 |
| 3 | 20.5 | 164.0 |
| 4 | 22.2 | 166.0 |
| 5 | 23.5 | 159.5 |

The preceding examples clearly indicate the preparation of the novel compound(s) of the present invention. Further, example #4 illustrates the use of 5-ethyl-1,2-diaminocyclohexane as an epoxy curing agent.

What is claimed is:

1. Nitrogen-containing compounds selected from compounds having the following formula:

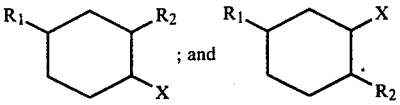

wherein X is selected from OH and NH$_2$, R$_1$ is selected from —CH=CH$_2$ and —C$_2$H$_5$ and R$_2$ is selected from —NH$_2$ and

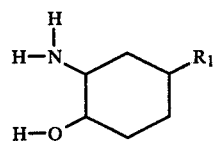

where R$_1$ has the value indicated above.

2. The nitrogen-containing compounds of claim 1, wherein X is NH$_2$, R$_1$ is —C$_2$H$_5$, and R$_2$ is NH$_2$.

3. The epoxy resin composition comprising an epoxy resin and at least one epoxy curing agent of the formula

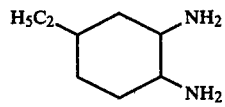

4. The epoxy resin composition of claim 3, wherein said epoxy resin is selected from the polyepoxides having at least two

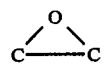

groups.

5. The epoxy resin composition of claim 4, wherein said groups are terminal groups.

6. The epoxy resin composition of claim 3, wherein said epoxy resin is a diglycidyl ether of bis-phenol.

7. In a method for curing an epoxy resin composition comprising incorporating an epoxy resin curing agent into an epoxy resin and heating the combination of the epoxy resin and the epoxy curing agent, the improvement which comprises said epoxy resin curing agent being represented by the formula:

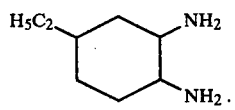

* * * * *